April 7, 1925.  1,532,932

J. R. PADESKY

PRESSURE GAUGE

Filed Feb. 26, 1924

Inventor
John R. Padesky
By
Attorneys

Patented Apr. 7, 1925.

1,532,932

UNITED STATES PATENT OFFICE.

JOHN R. PADESKY, OF LA CROSSE, WISCONSIN, ASSIGNOR TO NATIONAL GAUGE & EQUIPMENT COMPANY, OF LA CROSSE, WISCONSIN.

PRESSURE GAUGE.

Application filed February 26, 1924. Serial No. 695,312.

*To all whom it may concern:*

Be it known that I, JOHN R. PADESKY, a citizen of the United States, residing at La Crosse, in the county of La Crosse and State of Wisconsin, have invented certain new and useful Improvements in Pressure Gauges, of which the following is a specification.

My invention relates to pressure gauges, it particularly relating to that type of pressure gauge which employs a Bourdon tube connected with the indicating hand which moves over the dial and also relating to that type of gauge in which all the operating parts are mounted upon a suitable support which is enclosed in a casing.

One of the objects of the invention is to improve the manner of connecting the free or movable end of the Bourdon tube to the indicating hand so that calibrations may be more easily and readily made.

A further object of the invention is to improve the manner of securing the supporting element for the operating parts within the casing such that strain upon the screws or other fastening devices, which secure the casing and supporting element together, is to a great extent relieved.

Referring to the drawings.

Figure 1:
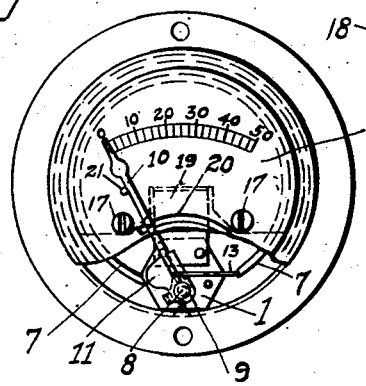
Fig. 1 is a front elevation of an instrument embodying my improvements, a portion of the bezel ring and dial being broken away to better illustrate the operating mechanism.
Figure 2:
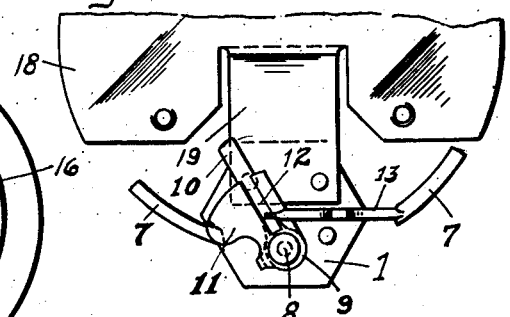
Fig. 2 is a front elevation of some of the operating parts and their support.
Figure 3:
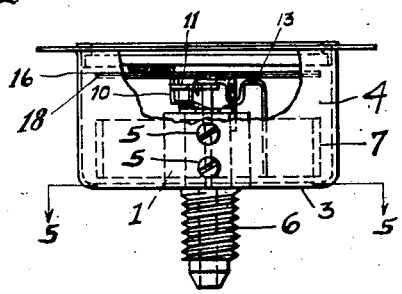
Fig. 3 is a side elevation of the instrument with the casing partly broken away to illustrate the operating parts.
Figure 4:
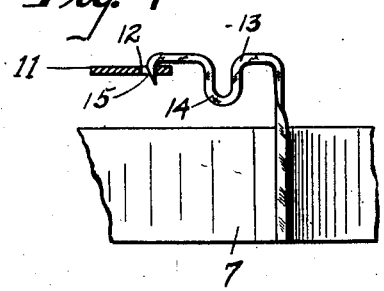
Fig. 4 is an enlarged view of a portion of the Bourdon tube looking at the forward side of the instrument showing the connection between the end of the tube and the crank arm which is associated with the pointer.

Referring to the drawings, 1 represents a channeled support for the operating parts having a plurality of flat sides, this support being shown as hexagonal in cross-section so as to fit a hexagonal opening 2 in the bottom 3 of a casing 4 and thus relieve to a large extent strain upon the screws 5 by which the casing is attached to the support. The lower end of the support has the usual threaded nipple 6 to receive the connection with the pressure source which in the present instance is an automobile oil pump, the present instrument being particularly intended as an oil indicator for automobiles.

Figure 6:
Fig. 6 is a side view of the pointer and its crank arm.
Figure 5:
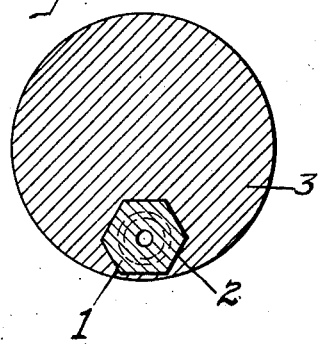
Fig. 5 is a section on the line 5—5 of Fig. 3.
Figure 7:
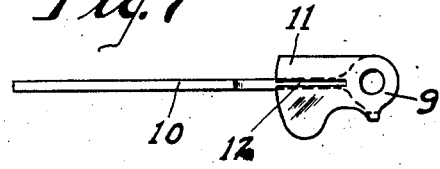
Fig. 7 is a top plan view of the same.

Connected with the support and communicating with the interior channel thereof is a Bourdon tube 7 of the usual form, and mounted upon a vertical pin or stud 8 projecting from the upper end of the support is a yoke 9 having projecting from the lower end thereof a pointer 10 and from the upper end thereof a crank arm 11, the crank arm being provided with a slotted opening 12. The other end of the Bourdon tube 7 has attached thereto a metallic connecting member 13 of an easily bendable character. This member 13 has a return bend 14 intermediate its length and at its free end a hook 15, the hook being inserted in the slot 12 of the crank arm 11 so that as the Bourdon tube tends to elongate or straighten out the pointer will be moved over the dial in a manner which will be understood. The dial with which the pointer cooperates is shown at 16 and is attached by screws 17 to a plate 18 which has a tongue 19 secured to the support 1, the dial being graduated in the usual way, as shown. The dial is provided in the usual way with a curved slot 20 and the pointer provided with right-angled bends as shown in Fig. 6 so that it will project through the slot from the rear of the dial and sweep over the front face of the dial.

To calibrate, the length of the member 13 may be readily changed to make it either longer or shorter by contracting or elongating the same at the bend 14 and the outer end of this member may also be bent laterally so as to cause it to engage the slot 12 at the proper distance from the axial center of the pivot pin 8. With the pointer resting against the stop 21, shown in Fig. 1, the length of the member 13 is adjusted so that the hook 15 will coincide with the slot 12 and then by bending the member 13 so as to position the hook 15 the proper distance from the axis of rotation of the pointer, the pointer may be given the proper throw by the elongation of the Bourdon tube to indicate the proper pressure.

Having thus described my invention, I claim:

In a pressure gauge, a graduated dial, a pivoted unitary yoke device comprising a crank arm and pointer, the crank arm being located above the pivoted end of the pointer, said crank arm having a slot extending in line with the pointer, a Bourdon tube and a metallic member having one end thereof rigidly connected with said tube and the other end thereof provided with a hook engaged in said slot, said member being also provided with a return bend intermediate its length, said member being of bendable material, for the purpose specified.

In testimony whereof, I have hereunto set my hand this 22nd day of February, 1924.

JOHN R. PADESKY